(12) United States Patent
Vandenberg

(10) Patent No.: US 10,666,107 B2
(45) Date of Patent: May 26, 2020

(54) PERMANENT MAGNET OFFSET SYSTEMS AND METHODS

(71) Applicant: Chad Ashley Vandenberg, Vancover, WA (US)

(72) Inventor: Chad Ashley Vandenberg, Vancover, WA (US)

(*) Notice: Subject to any disclaimer, the term of this patent is extended or adjusted under 35 U.S.C. 154(b) by 90 days.

(21) Appl. No.: 15/917,029

(22) Filed: Mar. 9, 2018

(65) Prior Publication Data

US 2018/0248435 A1    Aug. 30, 2018

Related U.S. Application Data

(63) Continuation of application No. 15/441,618, filed on Feb. 24, 2017, now Pat. No. 9,941,763.

(51) Int. Cl.
| | |
|---|---|
| *H02K 3/28* | (2006.01) |
| *H02K 1/17* | (2006.01) |
| *H02K 1/27* | (2006.01) |
| *H02K 21/24* | (2006.01) |

(52) U.S. Cl.
CPC ............... *H02K 3/28* (2013.01); *H02K 1/17* (2013.01); *H02K 1/27* (2013.01); *H02K 21/24* (2013.01)

(58) Field of Classification Search
CPC ........ H02K 1/17; H02K 21/04; H02K 21/046; H02K 37/00–24; H02K 7/09
USPC ................. 310/181, 90.5, 216.021, 216.022, 310/216.023, 154.02
See application file for complete search history.

(56) References Cited

U.S. PATENT DOCUMENTS

| | | | |
|---|---|---|---|
| 2,816,240 A | 12/1957 | Zimmerman | |
| 2,968,755 A | 1/1961 | Baermann | |
| 3,007,068 A | 10/1961 | Arnold et al. | |
| 4,077,678 A * | 3/1978 | Studer ................. | F16C 32/0465 |
| | | | 310/153 |
| 5,652,493 A | 7/1997 | Hendershot, Jr. | |
| 5,825,113 A | 10/1998 | Lipo et al. | |
| 6,246,561 B1 | 6/2001 | Flynn | |
| 7,683,514 B2 | 3/2010 | Onuma et al. | |
| 9,941,763 B1 * | 4/2018 | Vandenberg ............. | H02K 1/17 |
| 2009/0121571 A1 | 5/2009 | Onuma | |
| 2011/0070108 A1 | 3/2011 | Arita et al. | |
| 2014/0265693 A1 | 9/2014 | Gieras et al. | |

OTHER PUBLICATIONS

PCT International Search Report, PCT/US18/19371, dated Jul. 27, 2018.
PCT Written Opinion; PCT application PCT/US18/19371; dated Jul. 27, 2018.

* cited by examiner

*Primary Examiner* — Thomas Truong
(74) *Attorney, Agent, or Firm* — Fish IP Law, LLP

(57) ABSTRACT

A magnetic flux offset system selectively modifies the magnetic force at effective poles of a magnetic flux element. Magnetic flux from each effective pole is enhanced and/or effectively nullified using a control coil. The control coil directs magnetic flux from a magnetic flux donor to nullify magnetic flux from a flux donor at one effective pole. Magnetic flux from the control coil could also add to the magnetic flux from a flux donor at another effective pole. Reversing the current to the control coil could switch the effective pole where the magnetic flux is nullified and the effective pole where the magnetic flux is enhanced.

15 Claims, 3 Drawing Sheets

PERMANENT MAGNET OFFSET SYSTEMS AND METHODS

This application is a continuation of co-pending U.S. patent application Ser. No. 15/441,618 filed on Feb. 24, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is permanent magnet offset systems and methods.

BACKGROUND

The background description includes information that may be useful in understanding the present invention. It is not an admission that any of the information provided herein is prior art or relevant to the presently claimed invention, or that any publication specifically or implicitly referenced is prior art.

Motors with a rotor having permanently magnetized poles and a stator having electrically energized field poles suffer numerous disadvantages. The current for such motors is usually supplied from an alternating current source or from communicators rotating with the rotor. However, the maximum speed of such motors is limited by the frequency of the alternating current or by the ability to rapidly reverse the flow of the current in the field coil.

To address these problems, U.S. Pat. No. 2,968,755 to Baermann discloses a motor, which includes stator poles with permanent magnet means for magnetizing each stator pole. Baermann's stator poles also have a remotely actuated magnetic means of a greater magnetic strength than the permanent magnetic means, which could be used to reverse the magnetic polarity of its corresponding stator pole without needing to provide reversing alternating current. However, Baermann's stator only makes use of magnetic flux from one pole of each permanent magnet, and reversing the magnetic polarity of Baerman's stator is energetically demanding.

In U.S. Pat. No. 5,825,113, Lipo et al. discloses permanent magnetic machines that employ a field winding that can be used to weaken or boost an existing magnetic field. Lipo's motors comprise a pair of arched permanent magnets embedded in a stator yoke, a field winding, and armature windings. Half of Lipo's stator poles are dedicated magnetic north poles and half are dedicated magnetic south poles diametrically opposing the dedicated magnetic north poles. U.S. Pat. No. 2,816,240 to Zimmerman also employs similar principles to those disclosed by Lido. However, both Lipo and Zimmerman only use field windings to weaken or boost the variable magnetic fields.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for permanent magnet offset systems that vary the strength and quality of magnetic fields in a more energy-efficient manner.

SUMMARY OF THE INVENTION

The inventive subject matter provides systems and motors in which a nullifying magnetic flux donor effectively nullifies the effective magnetic flux at effective poles of a magnetic flux element. The magnetic flux element has at least two effective poles that each has at least one effective magnetic flux donor, such as a permanent magnet or an electromagnet, magnetically coupled to its respective effective pole. One or more nullifying magnetic flux donors are generally magnetically coupled to the magnetic flux element between the effective poles, or at least between the effective magnetic flux donors.

The effective magnetic flux donors exhibit a polarity opposite to that of the nullifying magnetic flux donor.

A control coil is used to direct magnetic flux from the nullifying magnetic flux donor towards any of the effective poles of the magnetic flux element. The control coil also provides magnetic flux that aggregates with magnetic flux from the nullifying magnetic flux donor to substantially nullify magnetic flux from the second magnetic flux donor at the second effective pole. The control coil could be wrapped around the magnetic flux element at each pole in a plurality of places to help direct, and aggregate, magnetic flux from the nullifying magnetic flux donor. For example, the control coil could be placed between the nullifying magnetic flux donor and a first effective magnetic flux donor, and between the same nullifying magnetic flux donor and a second effective magnetic flux donor.

When current flows through the control coil in one direction, it has a first active magnetic state. The magnetic flux from the control coil aggregates with, and directs, magnetic flux from the nullifying magnetic flux donor to substantially nullify magnetic flux from a first effective magnetic flux donor at the first effective pole. In this first active magnetic state, the second effective pole will exhibit the polarity of the second effective magnetic flux donor.

When the direction of the current is reversed, the control coil has a second active magnetic state. In the second active magnetic state, the magnetic flux from the control coil aggregates with, and directs, magnetic flux from the nullifying magnetic flux donor to substantially nullify magnetic flux from a second effective magnetic flux donor at the second effective pole. In this second active magnetic state, the first effective pole will exhibit the polarity of the first effective magnetic flux donor.

Advantageously, a switch can be used to select which effective magnetic flux donor to nullify in an energy-efficient manner by directing magnetic flux from the nullifying magnetic flux donor.

In other aspects of the inventive subject matter, a magnetic flux yoke can complete a magnetic circuit between the nullifying and effective magnetic flux donors. The yoke provides a magnetic path for magnetic flux from the opposing poles of the magnetic flux donors to flow and reinforce one another. The magnetic path of the yoke also minimizes interference from the opposing magnetic flux of each magnetic flux donor.

In some embodiments, additional magnetic flux donors are magnetically coupled to the magnetic flux element proximate to the effective poles via their respective poles that exhibit the first polarity. When the control coils are in the first active magnetic state, magnetic flux from the control coils further aggregates with, and directs, magnetic flux from the nullifying magnetic flux donor to substantially nullify magnetic flux from all of the effective magnetic flux donors at the second effective pole. When the control coil is in the first active magnetic state, magnetic flux from the control coils further aggregates with, and directs, magnetic flux from the nullifying magnetic flux donor to substantially nullify magnetic flux from all of the effective magnetic flux donors at the second effective pole.

In other embodiments, the magnetic flux element includes a gap that at least partially extends into the control coil towards each of the effective poles. Another magnetic flux donor may be positioned in the gap such that it donates magnetic flux of the second polarity to the effective magnetic flux element on one side of the gap and donates magnetic flux of the first polarity to the effective magnetic flux element on the other side of the gap.

The inventor further contemplates that the inventive magnetic offset systems can be used as stators in motors having rotors having ferrous elements (e.g., permanent magnets) that pass through effective magnetic fields of one effective pole when the control coil is in the first active magnetic state and another effective pole when the control coil is in the second active magnetic state. The first ferrous elements are distributed around the rotor perimeter. In some embodiments, the rotor includes an odd number of ferrous element pairs.

In yet further embodiments of the inventive subject matter, the motor of claim may employ a second a second magnetic flux offset system as a second stator.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
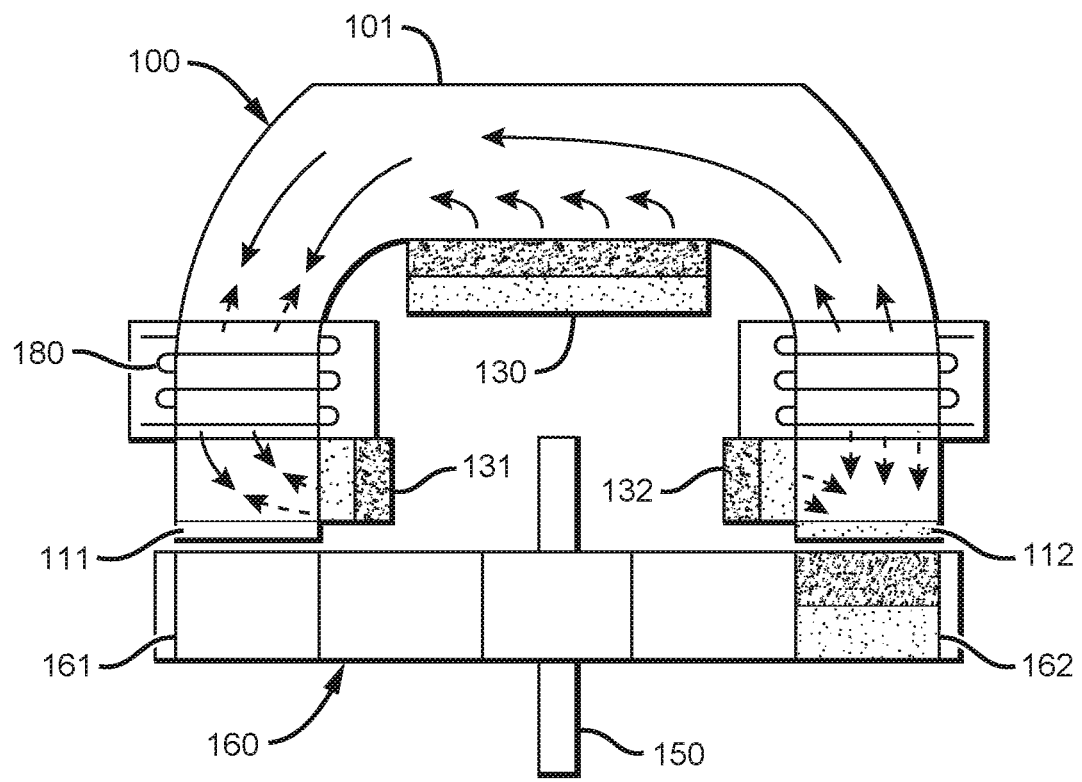
FIG. 1A is a side view of one embodiment of a motor.
Figure 1B:
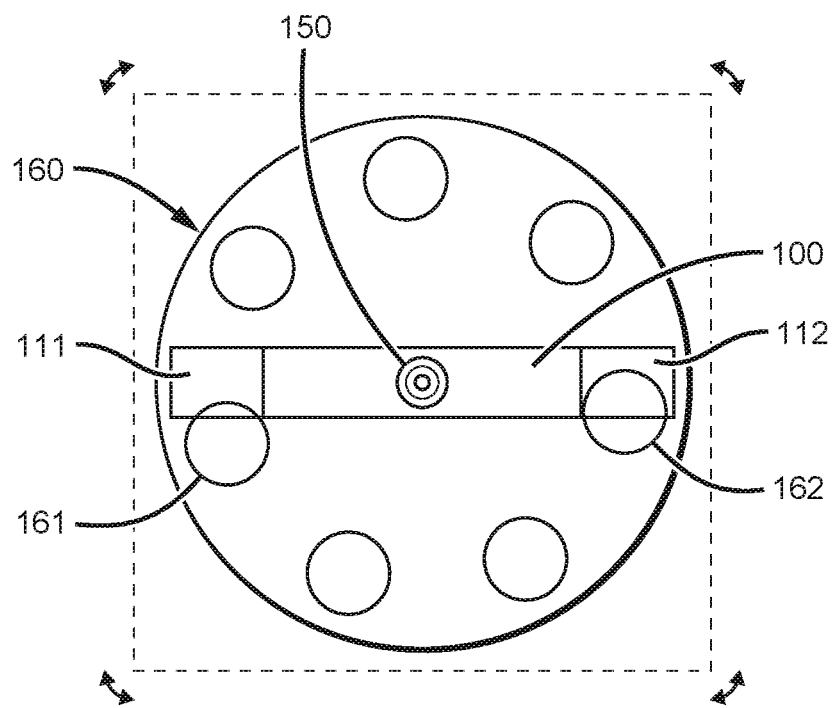
FIG. 1B is a plan view of one embodiment of a motor.

FIG. 1A shows a motor comprising magnetic flux offset system 100 and rotor 160. Magnetic flux offset system 100 includes magnetic flux element 101 is magnetically coupled to permanent magnets, 130, 131, and 132. Although permanent magnets, 130, 131, and 132 are shown, use of temporary magnets (e.g., electromagnets) is also contemplated. The polarity of control coil 180 is reversible. As used herein, the term "control coil" means a single wire, multiple separate wires with the same input source, or multiple separate wires whose separate input sources are synchronized with one another to provide current in the same direction. In other words, the control coil can employ any suitable electrical configuration to provide and direct magnetic flux that can be reversed.

The term "active magnetic state" is defined herein as a state in which current flows in one direction along the control coil to provide magnetic flux to the magnetic flux element and to direct the flow of existing magnetic flux within the magnetic flux element. The polarity of the control coil in a first active magnetic state changes when the direction of the current is reversed, changing the control coil to a second active magnetic state. This contrasts with a passive magnetic state, when no current is applied to the control coil.

In the active magnetic state shown in FIG. 1A, the portion of control coil 180 that is nearest to effective pole 111 generates magnetic north flux directed towards the top of magnetic flux element 101, which completes a magnetic flux circuit with magnetic south flux from permanent magnet 130. That portion of control coil 180 also generates magnetic south flux directed towards the bottom of magnetic flux element 101, which aggregates with south magnetic flux from permanent magnet 130 and completes a magnetic circuit with the north magnetic flux from permanent magnet 131. Preferably, the aggregate south magnetic flux from control coil 180 and permanent magnet 130 is substantially equal to the north magnetic flux provided by permanent magnet 131 to minimize either magnetic north flux or magnetic south flux from having any effect on rotor 160. Thus, in this first active magnetic state, the magnetic flux at effective pole 111 directed towards rotor 160 is substantially nullified.

In the same first active magnetic state, the portion of control coil 180 nearest to effective pole 112 adds north magnetic flux to the north magnetic flux from permanent magnet 132, ensuring that an effective north magnetic flux field flows from effective pole 112 towards rotor 160. As used herein the term "effective magnetic field" refers to the magnetic field at the effective pole that emits magnetic flux in the first or second active magnetic state, and which provides motive force to push or pull the rotor ferrous element(s). South magnetic flux from that portion of control coil 180 is directed towards the top of magnetic flux element 101 to aggregate with the south magnetic flux from permanent magnet 130 and completes a magnetic circuit with the north magnetic flux from the control coil near effective pole 111.

In the second active magnetic state, the portion of control coil 180 that is nearest to effective pole 111 generates magnetic south flux directed towards the top of magnetic flux element 101, which aggregates with south magnetic flux from permanent magnet 130 and completes a magnetic circuit with the north magnetic flux from permanent magnet 132. That portion of control coil 180 also generates magnetic north flux directed towards the bottom of magnetic flux element 101, which aggregates with magnetic north flux from permanent magnet 131. Preferably, the aggregate south magnetic flux from control coil 180 and permanent magnet 130 is substantially equal to the north magnetic flux provided by permanent magnet 132. Thus, in the second active magnetic state, the magnetic flux at effective pole 112 directed towards rotor 160 is substantially nullified.

In the second active magnetic state, the portion of control coil 180 nearest to effective pole 112 directs south magnetic flux toward effective pole 112 to complete a magnetic circuit with the north magnetic flux from permanent magnet 132. North magnetic flux from that portion of control coil 180 is directed towards the top of magnetic flux element 101 to complete a magnetic circuit with the south magnetic flux from permanent magnet 130 and south magnetic flux from the control coil near effective pole 111, ensuring that an effective north magnetic flux field flows from effective pole 111 towards rotor 160.

Therefore, it should be appreciated that a switch and control coil can be used to select which magnetic flux donor (at opposing stator poles) to nullify in an energy-efficient manner by directing nullifying magnetic flux from a magnetic flux donor.

Rotor 160 has shaft 150 and ferrous elements 161 and 162. In FIG. 1A, north magnetic flux from effective pole 112 applies an attractive force towards the south pole of ferrous element 162, providing motive force. Preferably, when ferrous element 162 passes effective pole 112, a switch flips control coil 180 to nullify the attractive force from effective pole 112 so that ferrous element 162 passes without any stopping force being applied to rotor 160. As rotor 160 rotates, ferrous elements 161 and 162 "rotatively pass" through effective magnetic fields of the effective poles. Preferably, both ferrous elements 161 and 162 are permanent magnets having a south pole that faces the effective poles, but ferrous elements 161 and 162 could be any ferrous element that is attracted to an active effective pole, such as non-permanent magnets or electromagnets.

Although the motor shown in FIGS. 1-4 show one pair of effective poles and one pair of rotor poles, stators having more than one pair of effective poles are contemplated. Rotors can have an either an odd number or an even number of ferrous element pairs. Preferred embodiments of the inventive motors have stators with any even number of effective poles, for example four or six pairs of effective poles. The corresponding rotors preferably have an odd number of ferrous elements that are not diametrically opposite to a center of the rotor, which ensures that only one ferrous element is acted upon by an active effective pole as illustrated in FIG. 1B. As rotor 160 rotates clockwise, ferrous element 162 rotates away from effective pole 112 of magnetic flux element 100. As effective pole 111 switches from a substantially nullified state to a magnetic state, effective pole 111 attracts ferrous element 161, and ferrous element 161 rotates toward effective pole 111. Ferrous elements 161, 162, and the five unlabeled ferrous elements can either be magnetic or nonmagnetic.

When magnets are employed as ferrous elements, the magnetic effective pole can either attract or repel the ferrous elements. When nonmagnetic ferrous elements are employed, the magnetic, effective pole can attract each ferrous element as it enters the magnetic field of the magnetic effective pole. In another exemplary embodiment, a rotor having three "pairs" of ferrous elements can be employed with a stator having four effective poles. In some embodiments, stators have an even number of effective poles, and rotors have an odd number of ferrous elements. In other embodiments, stators have an odd number of effective poles, and rotors have an even number of ferrous elements. In other words, any number of effective poles and ferrous elements could be suitably utilized.

Figure 2:
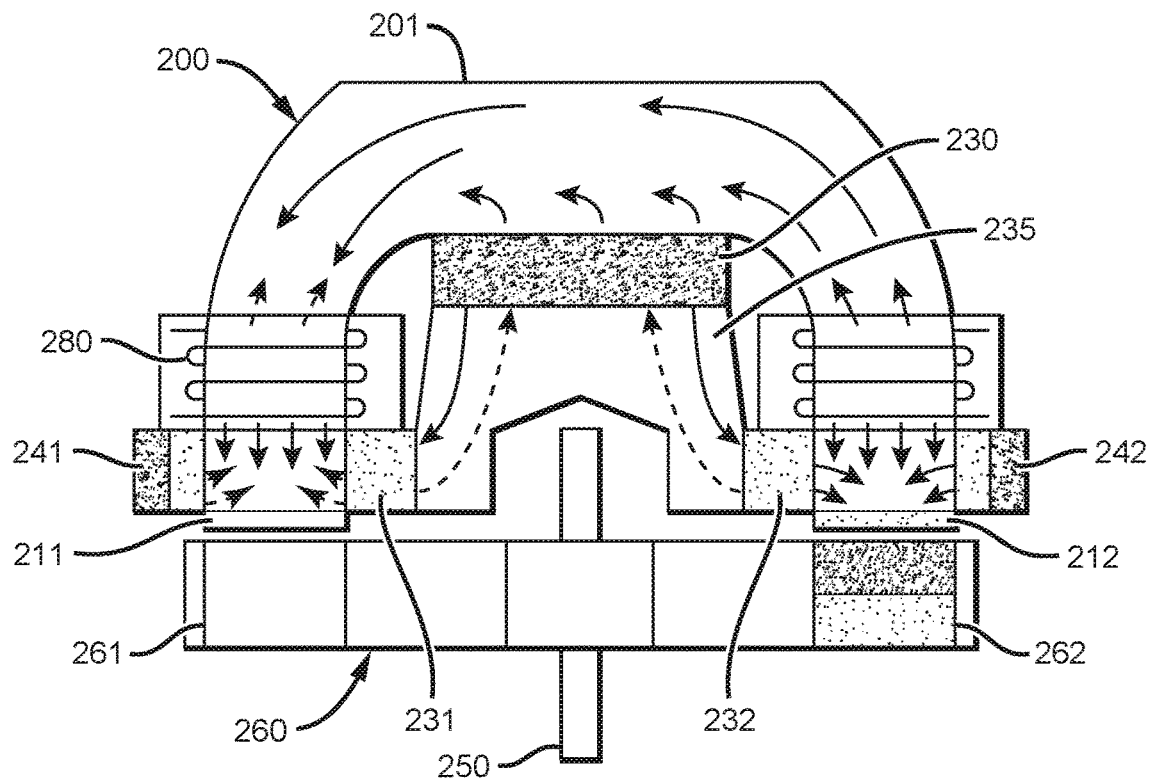
FIG. 2 is a side view of a second embodiment of a motor.

FIG. 2 illustrates another embodiment of a motor comprising a magnetic flux offset system 200 and rotor 260. Magnetic flux element 201 is magnetically coupled to magnetic south flux donor 230, magnetic north flux donors 231 and 232, and permanent magnets 241 and 242. Flux yoke 235 completes the magnetic circuit between south flux donor 230 and north flux donors 231 and 232, which advantageously enhances the magnetic flux at each point of contact between magnetic flux element 200 and flux donors 230, 231, and 232. Flux yoke 235 also prevents magnetic flux from magnetic south flux donor 230 and magnetic north flux donors 231 and 232 from interfering spatially with the flux fields in magnetic flux element 201 by providing a low reluctance path for the magnetic flux from flux donors 230, 231, and 232 to complete a magnetic circuit.

Additional north magnetic flux is donated to magnetic flux element 201 at effective poles 211 and 212 by magnetic flux donors 241 and 242, respectively. Like magnetic offset system 100, the direction of the current flowing through control coil 280 controls which one of effective poles 211 and 212 exhibits a magnetic north polarity.

In the active magnetic state shown in FIG. 2, the north magnetic flux at effective poles 211 is substantially nullified, and effective pole 212 exhibits magnetic north polarity. The magnetic north flux from effective pole 212 interacts with magnetic south flux from ferrous element 262 of rotor 260, which could be a permanent magnet as shown, or any other suitable ferrous element. Rotor 260 further comprises ferrous element 261 and shaft 250.

Figure 3:
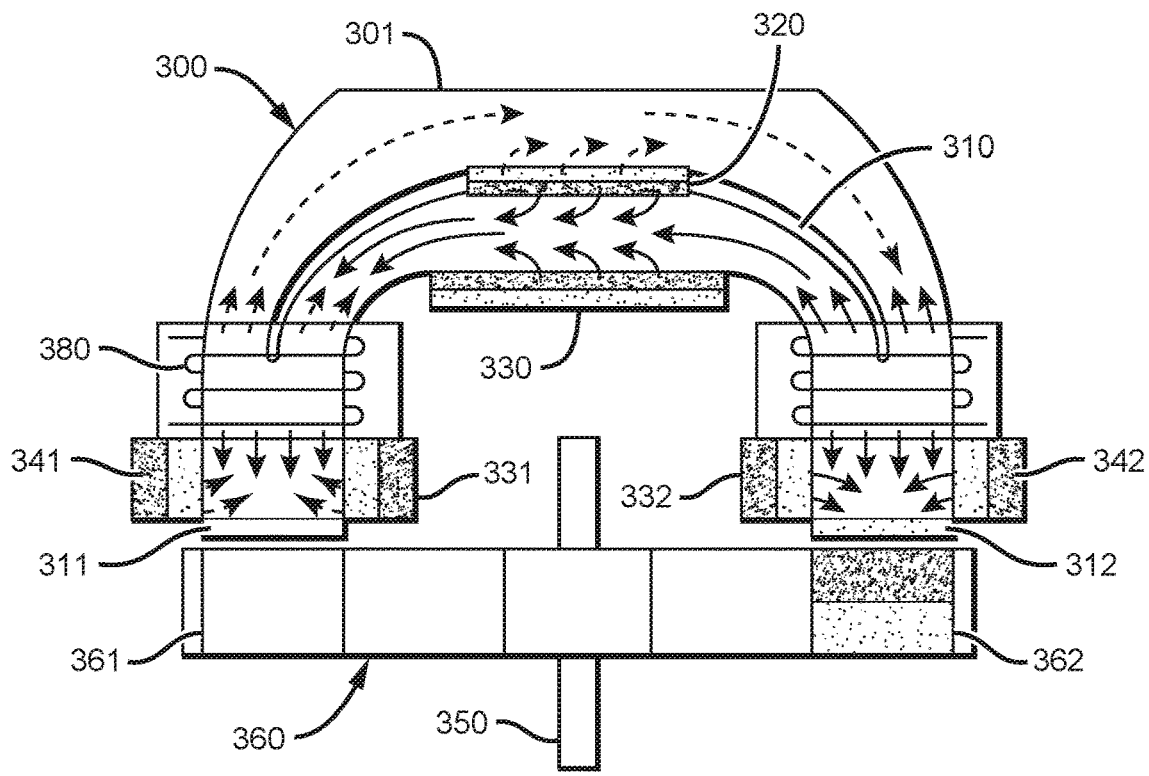
FIG. 3 is a side view of a third embodiment of a motor.

In FIG. 3, a magnetic flux offset system 300 acts as a stator to rotor 160. Rotor 360 has shaft 350 and ferrous elements 361 and 362. Magnetic offset system 300 includes magnetic flux element 301, which has gap 310 that extends at least partially into control coil 380 at two places: effective pole 311 and effective pole 312. Permanent magnet 320 is disposed in gap 310 and donates magnetic north flux to the upper portion of magnetic flux element 301, and donates magnetic south flux to the lower portion of magnetic flux element 301. Permanent magnet 330 also donates magnetic south flux to the lower portion of magnetic flux element 301. Magnetic north flux is donated to effective pole 311 from magnetic north flux donors 331 and 341. Magnetic south flux is donated to effective pole 312 from magnetic north flux donors 332 and 342.

In a first active magnetic state, magnetic north flux travels from control coil 380, along magnetic flux element 301, toward effective pole 312. Thus, control coil 380 adds magnetic north flux to the magnetic north flux from permanent magnet 320. The combined flux completes a circuit with magnetic south flux from the portion of control coil near effective pole 312 and adds to the magnetic north flux from permanent magnets 332 and 342, augmenting the magnetic north flux from effective pole 312.

In the first active magnetic state, magnetic south flux travels from control coil 380, along magnetic flux element 301 toward effective pole 311. Magnetic south flux from the portion of control coil 380 nearer to effective pole 312 and magnetic south flux donors 320 and 330 complete a magnetic circuit with magnetic north flux from the portion of control coil 380 nearer to effective pole 311 and magnetic south flux donors 331 and 341. Thus, the magnetic north flux at effective pole 311 is substantially nullified. Like the embodiments in FIGS. 1 and 2, the opposite will occur in the second, opposing active magnetic state of control coil 380.

Figure 4:
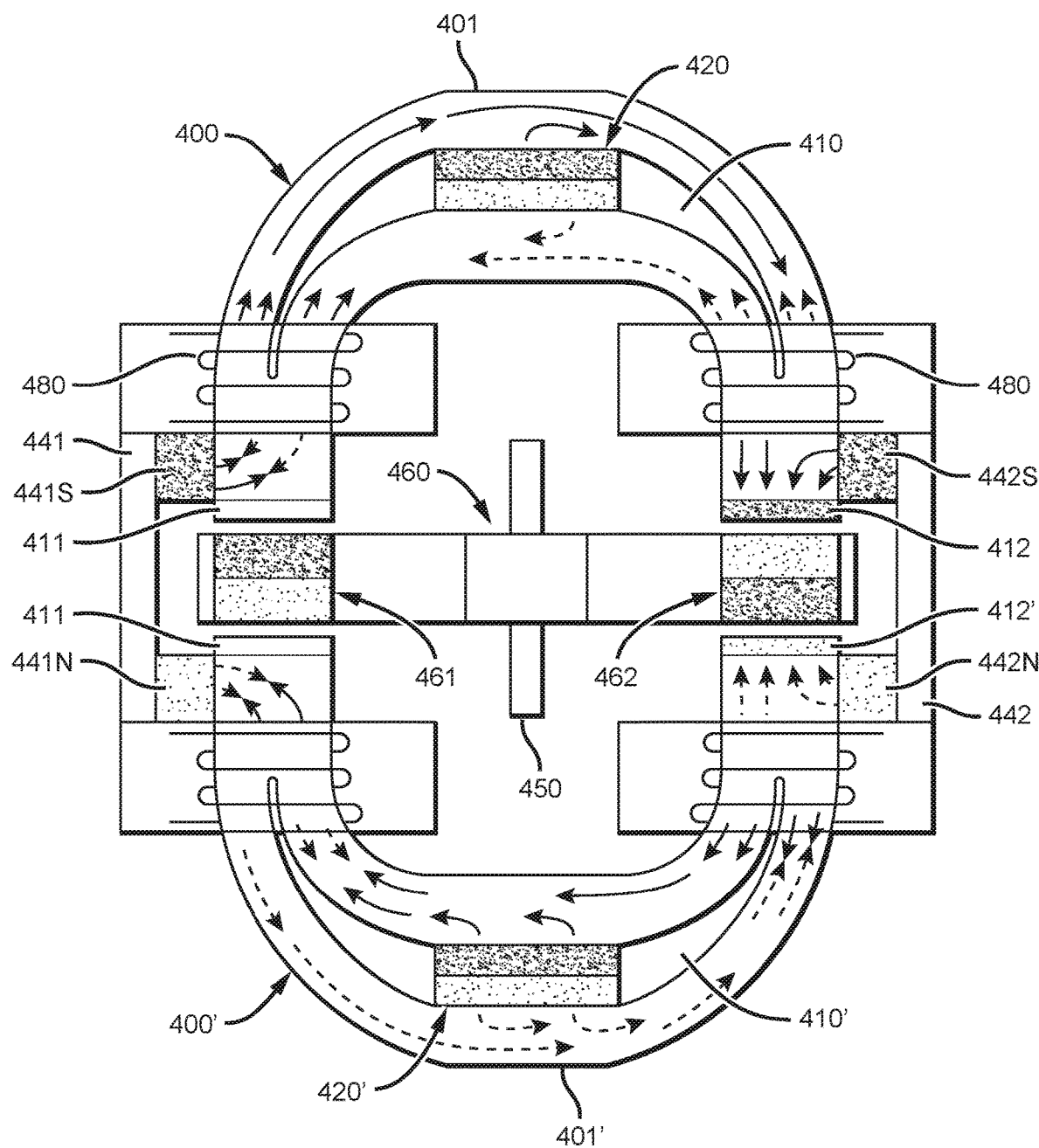
FIG. 4 is a side view of a fourth embodiment of a motor.

FIG. 4 shows another engine having two magnetic flux offset systems 400 and 400'. Magnetic flux element 401 of magnetic flux offset system 400 has gap 410, which extends at least partially into control coil 480. Permanent magnet 420 donates magnetic south flux to the outer portion of magnetic flux element 301 and magnetic north flux to the inner portion of magnetic flux element 401. Stator 400 is magnetically coupled to stator 400' via magnetic south flux donors 441S and 442S, yokes 441 and 442, and magnetic north flux donors 441N and 442N.

Similarly, magnetic flux element 401' of stator 400' has gap 410', which extends at least partially into control coil 480'. Permanent magnet 420' donates magnetic south flux to the inner portion of magnetic flux element 401' and magnetic north flux to the outer portion of magnetic flux element 401'.

When control coil 480 is in a first active magnetic state, the magnetic flux at poles 411 and 411' are substantially nullified. Effective pole 412 exhibits magnetic south polarity, and effective pole 412' exhibits magnetic north polarity. Thus, effective pole 412 interacts with magnetic north flux from ferrous element 462 of stator 460. Effective pole 412' interacts with magnetic south flux from ferrous element 462.

These combined interactions give rise to rotation of shaft 460 about shaft 450 and the motive force of the motor. In the contemplated embodiment, effective poles 412 and 412' attract and pull on ferrous element 462, but the permanent magnet in ferrous element 462 could be reversed to allow effective poles 412 and 412' to push upon ferrous element 462.

In other embodiments, motors could comprise one or more stators, which each comprise magnetic flux element(s) having 4, 6, 8, 10, or more effective poles. During operation of such motors, the nullifying magnetic flux donor effectively nullifies the effective magnetic flux from magnetic flux donors at successive effective poles in a clockwise or counterclockwise direction. The control coil is used to direct magnetic flux from the nullifying magnetic flux donor towards each effective pole that is effectively, magnetically nullified. The control coil also provides magnetic flux that aggregates with magnetic flux from the magnetic flux donor at each effective pole that is opposite to a magnetically nullified effective pole, enhancing the magnetic flux at those poles. It should be appreciated that one or more pairs of magnetically nullified/enhanced effective poles can be active depending on the number of rotor poles.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. Unless otherwise indicated herein, each individual value is incorporated into the specification as if it were individually recited herein.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all the appended claims.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A magnetic flux offset system comprising:
   a magnetic flux element having a first effective pole and a second effective pole, wherein the magnetic flux element comprises at least one magnetic path from the first effective pole to the second effective pole through the magnetic flux element;
   a first, second, and third magnetic flux donor,
      wherein the first and second magnetic flux donors are magnetically coupled to the magnetic flux element proximate to the first and second effective poles, respectively,
      wherein the third magnetic flux donor includes a first permanent magnet within the magnetic flux element and a second permanent magnet contiguously coupled to the magnetic flux element between the first and second magnetic flux donors,
      wherein the first and second magnetic flux donors exhibit a first polarity to the magnetic flux element, and
      wherein the third magnetic flux donor exhibits a second polarity, opposite the first polarity, to the magnetic flux element; and
   a control coil wrapped around the magnetic flux element,
      wherein the control coil has a first active magnetic state that aggregates with, and directs, magnetic flux from the third magnetic flux donor to substantially nullify magnetic flux from the second magnetic flux donor at the second effective pole, and
      wherein the control coil has a second active magnetic state that aggregates with, and directs, magnetic flux from the third magnetic flux donor to substantially nullify magnetic flux from the first magnetic flux donor at the first effective pole.

2. The magnetic flux offset system of claim 1,
   wherein the first effective pole exhibits the first polarity when the control coil is in the first active magnetic state, and
   wherein the second effective pole exhibits the first polarity when the control coil is in the second active magnetic state.

3. The magnetic flux offset system of claim 1 further comprising a magnetic flux yoke that completes a magnetic circuit between the first, second, and third magnetic flux donors.

4. The magnetic flux offset system of claim 3 further comprising fourth and fifth magnetic flux donors magnetically coupled to the magnetic flux element proximate to the first and second effective poles, respectively, and wherein the fourth and fifth magnetic flux donors exhibit the first polarity.

5. The magnetic flux offset system of claim 4,
wherein the first active magnetic state further aggregates with, and directs, magnetic flux from the third magnetic flux donor to substantially nullify magnetic flux from the fifth magnetic flux donor at the second effective pole, and
wherein the second active magnetic state further aggregates with, and directs, magnetic flux from the third magnetic flux donor to substantially nullify magnetic flux from the fourth magnetic flux donor at the first effective pole.

6. The magnetic flux offset system of claim 1, wherein the first, second, and third magnetic flux donors are permanent magnets.

7. The magnetic flux offset system of claim 6, further comprising:
a fourth magnetic flux donor, disposed in the gap, that exhibits the first polarity,
a fifth magnetic flux donor, disposed in the gap, that exhibits the second polarity,
wherein the fifth magnetic flux donor is magnetically coupled to, and donates magnetic flux of the second polarity to, a first portion of the magnetic flux element on a first side of the gap, and
wherein the fourth magnetic flux donor is magnetically coupled to, and donates magnetic flux of the first polarity to, a second portion of the magnetic flux element on a second side of the gap opposite to the first side of the gap.

8. The magnetic flux element of claim 7, wherein the third and fifth magnetic flux donors are magnetically coupled to opposing sides of the first portion of the magnetic flux element.

9. The magnetic flux offset system of claim 7 further comprising sixth and seventh magnetic flux donors magnetically coupled to the magnetic flux element proximate to the first and second effective poles, respectively, and wherein the sixth and seventh magnetic flux donors exhibit the first polarity.

10. The magnetic flux offset system of claim 1, wherein the magnetic flux element further comprises a gap that at least partially extends into the control coil toward the first effective pole and extends at least partially into the control coil toward the second effective pole.

11. The magnetic flux offset system of claim 1, wherein the control coil is wrapped around the flux element between the first and third magnetic flux elements and between the second and third magnetic flux elements.

12. A motor comprising:
a magnetic flux element having a first effective pole and a second effective pole, wherein the magnetic flux element comprises at least one magnetic path from the first effective pole to the second effective pole through the magnetic flux element;
a first, second, and third magnetic flux donor,
wherein the first and second magnetic flux donors are magnetically coupled to the magnetic flux element proximate to the first and second effective poles, respectively,
wherein the third magnetic flux donor includes a first permanent magnet within the magnetic flux element and a second permanent magnet contiguously coupled to the magnetic flux element between the first and second magnetic flux donors,
wherein the first and second magnetic flux donors exhibit a first polarity to the magnetic flux element, and
wherein the third magnetic flux donor exhibits a second polarity, opposite the first polarity, to the magnetic flux element, and
a control coil wrapped around the magnetic flux element,
wherein the control coil has a first active magnetic state that aggregates with, and directs, magnetic flux from the third magnetic flux donor to substantially nullify magnetic flux from the second magnetic flux donor at the second effective pole, and
wherein the control coil has a second active magnetic state that aggregates with, and directs magnetic flux from the third magnetic flux donor to substantially nullify magnetic flux from the first magnetic flux donor at the first effective pole,
wherein the second effective pole exhibits the first polarity when the control coil is in the second active magnetic state, and
a rotor having a first ferrous element and a second ferrous element that both rotatively pass through effective magnetic fields of the first effective pole when the control coil is in the first active magnetic state and the second effective pole when the control coil is in the second active magnetic state.

13. The motor of claim 12, wherein the first ferrous element has a permanent magnet.

14. The motor of claim 12, wherein the first ferrous element is located at a first ferrous portion of a rotor perimeter and the second ferrous element is located at second ferrous portion of the rotor perimeter.

15. The motor of claim 14, wherein the rotor comprises an odd number of ferrous portions.

\* \* \* \* \*